United States Patent
Hatanaka

(10) Patent No.: US 10,394,214 B2
(45) Date of Patent: Aug. 27, 2019

(54) NUMERICAL CONTROLLER TEMPORARILY STOPPING FOR A PROGRAM CALL AND NUMERICAL CONTROL METHOD THEREOF

(71) Applicant: FANUC Corporation, Minamitsuru-gun, Yamanashi (JP)

(72) Inventor: Noriaki Hatanaka, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 529 days.

(21) Appl. No.: 14/509,098

(22) Filed: Oct. 8, 2014

(65) Prior Publication Data

US 2015/0105879 A1     Apr. 16, 2015

(30) Foreign Application Priority Data

Oct. 16, 2013 (JP) .................................. 2013-215852

(51) Int. Cl.
*G05B 19/4155* (2006.01)
*G05B 19/18* (2006.01)

(52) U.S. Cl.
CPC ......... *G05B 19/18* (2013.01); *G05B 19/4155* (2013.01); *G05B 2219/31203* (2013.01)

(58) Field of Classification Search
CPC ................. G06F 17/3089; G06Q 30/02; Y10S 707/99953; Y10S 707/99954; G05B 19/18; G05B 19/4155; G05B 2219/31203; G05B 19/418

USPC .......................................................... 700/86
See application file for complete search history.

(56) References Cited

U.S. PATENT DOCUMENTS

| | | | |
|---|---|---|---|
| 5,793,635 A * | 8/1998 | Niwa ................... | G05B 19/406 318/570 |
| 2007/0198125 A1 | 8/2007 | Hosokawa et al. | |
| 2008/0294877 A1* | 11/2008 | Haga .................. | G05B 19/4155 712/216 |

(Continued)

FOREIGN PATENT DOCUMENTS

| CN | 1835380 A | 9/2006 |
|---|---|---|
| CN | 102789193 A | 11/2012 |

(Continued)

OTHER PUBLICATIONS

Office Action dated Jul. 22, 2016 in German Patent Application No. 10 2014 015 333.9 (8 pages) with an English Translation (5 pages).

(Continued)

*Primary Examiner* — Robert E Fennema
*Assistant Examiner* — Marzia T Monty
(74) *Attorney, Agent, or Firm* — Drinker Biddle & Reath LLP

(57) ABSTRACT

A numerical controller analyzes a program with a command program analysis unit, and determines a macro call or a sub program call with a macro call or sub program call determination unit. When a program stop determination unit determines that the program is to be stopped, the program stop determination unit commands a program stop requesting unit to output a program stop request to the command program analysis unit and an interpolation processing unit, thereby stopping the program.

10 Claims, 6 Drawing Sheets

AFTER STOP AT O0100, INFORMATION OF CALLING SIDE IS DISPLAYED
PROGRAM OF CALLING SIDE: O9010
BLOCK OF CALLING SIDE: G65P100L2A1.0B2.0

(56) References Cited

U.S. PATENT DOCUMENTS

| 2011/0015771 | A1* | 1/2011 | Guo | G05B 19/4063 |
| | | | | 700/97 |
| 2012/0096437 | A1* | 4/2012 | Bates | G06F 11/3656 |
| | | | | 717/125 |
| 2013/0178974 | A1* | 7/2013 | Kudou | G05B 19/4155 |
| | | | | 700/174 |

FOREIGN PATENT DOCUMENTS

| JP | H04-343689 A | 11/1992 |
| JP | 2007-226383 A | 9/2007 |

OTHER PUBLICATIONS

Cheng Zhang et al., "Automated Breakpoint Generation for Debugging," Journal of Software, vol. 8, No. 3, pp. 603-616, Mar. 2013.
Notification of First Office Action dated Jun. 29, 2016 in Chinese Patent Application No. 2014105494008 (6 pages) with an English Translation (8 pages).

\* cited by examiner

--Prior Art--

--Prior Art--

--Prior Art--

--Prior Art--

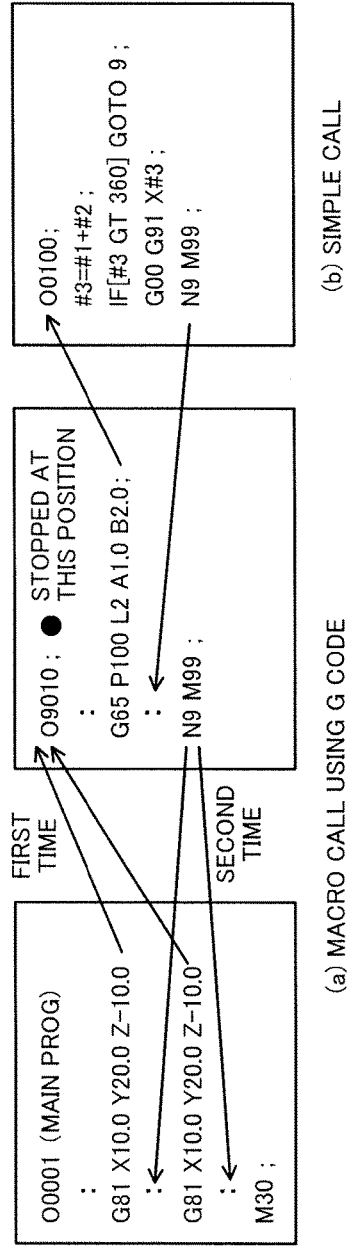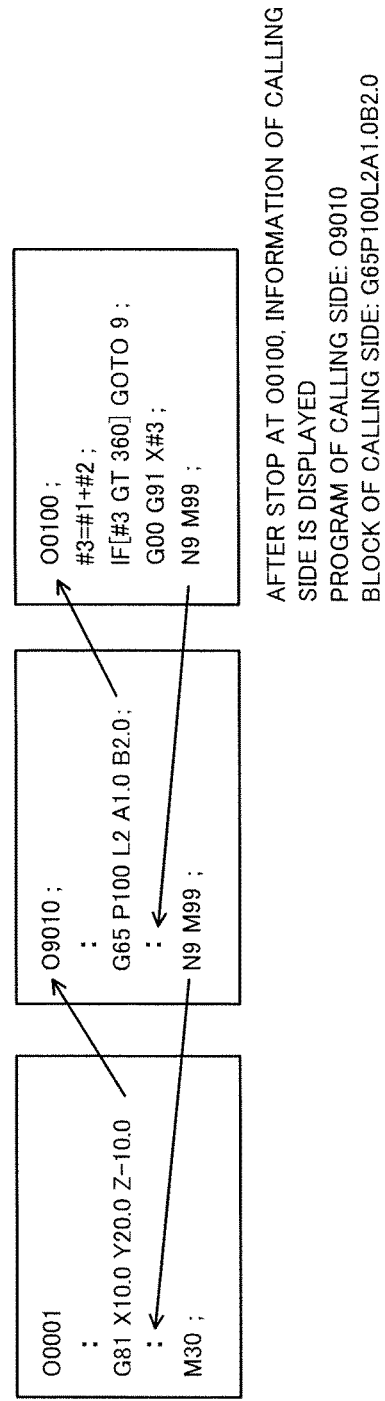

FIG. 7

| ABSOLUTE | | | 01 O0001 (MAIN PROG) |
|---|---|---|---|
| X | | −60.000 | 02 O9010 |
| Y | | −35.400 | 03 O0100 |
| Z | | −100.000 | //CNC_MEM/USER/PATH1/ |

| MODAL | | | | G65 P100 L2 A1.0 B2.0; ← INFORMATION OF CALLING SIDE |
|---|---|---|---|---|
| G01 | G40 | F | 3000 M 6 | O0100; ← INFORMATION OF CALLED PROGRAM |
| G17 | G49 | H | | #3=#1+#2 ; |
| G91 | G80 | D | | IF[#3 GT 360] GOTO 9 ; |
| G22 | G98 | T | | G00 G91 X#3 ; |
| G94 | G50 | S | | N9 M99 ; |
| G21 | | | | |

NUMERICAL CONTROLLER TEMPORARILY STOPPING FOR A PROGRAM CALL AND NUMERICAL CONTROL METHOD THEREOF

RELATED APPLICATION DATA

This application claims priority under 35 U.S.C. § 119 and/or § 365 to Japanese Application No. 2013-215852 filed Oct. 16, 2013, the entire contents is incorporated herein by reference.

BACKGROUND OF THE INVENTION

1. Field of the Invention

The present invention relates to a numerical controller that enables a sub program call and a numerical control method thereof.

2. Description of the Related Art

A numerical controller that controls a machine tool includes a sub program call function and a macro call function.

<Sub Program Call and Macro Call>

A sub program is a program in which a certain fixed operation and/or an operation performed in a repeated manner is registered. With a sub program call used in a main program, the writing of a program can be simplified. Furthermore, a macro call is a function with which an argument can be specified for a sub program, whereby a call with higher versatility is achieved.

FIG. 1 is an example of a sub program call and FIG. 2 is an example of a macro call. In FIG. 2, "A1.0" and "B2.0" in a G65 block are passed to O9010 as arguments and used as variables such as macro variables #1 and #2. A macro call using G65 is called a simple call. A macro call similar to the one with G65, performed using a G code registered in advance (not illustrated), is called a macro call using a G code.

A numerical controller that controls a machine tool also includes a function to stop execution of a program in the middle of the execution of the program to perform an operation check of the program (single block operation function, function to stop in accordance with sequence number specification).

<Single Block Operation>

FIG. 3 is a diagram illustrating a single block operation. A single block operation is a function to execute one block of a program for each startup of automatic operation before stopping the automatic operation. This enables an easy operation check of a program. In a single block operation, when a workpiece 2 is machined using a tool 3, the tool 3 is stopped in each of the positions of a stop 4, a stop 5, and a stop 6 and the next block is executed in accordance with a command.

However, there is a problem that checks become troublesome because a stop is made in every block while the function of this single block operation is effective.

<Stop in Accordance with Sequence Number Specification>

FIG. 4 is a diagram illustrating a stop in accordance with sequence number specification. A stop in accordance with sequence number specification is a function to stop automatic operation when a block is executed that corresponds to a program number and a sequence number preset prior to operation of a program. This enables an easy operation check of a program. In the example illustrated in FIG. 4, a sub program O0010 is called by a block written as "M98P0010" in a main program O0001. A block written as "N20 G04 P500;" in the sub program O0010 is a block commanding a stop (dwell) of 0.5 seconds, which is specified by a block N20 in the main program O0001 as a block for stop in accordance with a sequence number.

However, there is a problem that checks at stops become troublesome for a common sub program called by many programs because stops are always made at specified points regardless of the program calling method.

SUMMARY OF THE INVENTION

An object of the present invention is accordingly to provide a function to smoothly perform an operation check by temporarily stopping execution of a program immediately after a sub program call or a macro call in a numerical controller that controls a machine tool.

More specifically, the present invention provides a numerical controller temporarily stopping for a program call that temporarily stops a program to enable checks of the name of a program that is calling, the name of a program that is called, a coordinate value at the time of the call, modal information at the time of the call, a macro variable value, and the like and further enable a check of an argument in the case of a macro call.

The numerical controller according to the present invention has a macro call function or a sub program call function and includes a program analysis unit, a determination unit, and a program stopping unit. The program analysis unit analyzes a program. The determination unit determines whether a command of the analyzed program is a macro call or a sub program call. The program stopping unit stops execution of the program immediately after a macro call or a sub program call when the determined command includes a macro call or a sub program call.

The program stopping unit may stop a program at the time of a first call and may not stop the program at the time of a second call or a call thereafter.

The numerical controller according to the present invention may include a display unit that displays information of a calling side when the program is stopped at the time of the stop immediately after a macro call or a sub program call.

A numerical control method of a numerical controller according to the present invention is a numerical control method of a numerical controller that has a macro call function or a sub program call function. This numerical control method of a numerical controller includes analyzing a program, determining whether a command of the analyzed program is a macro call or a sub program call, and stopping execution of the program immediately after a macro call or a sub program call when the determined command includes a macro call or a sub program call. The stopping of execution of the program may be performed at the time of a first call and may not be performed at the time of a second call or a call thereafter.

At the stopping immediately after a macro call or a sub program call, information of a calling side may be displayed when the program is stopped.

With the configuration described above, the present invention can provide a function to smoothly perform an operation check by temporarily stopping execution of a program immediately after a sub program call or a macro call in a numerical controller that controls a machine tool.

More specifically, the present invention provides a numerical controller temporarily stopping for a program call that temporarily stops a program to enable checks of the name of a program that is calling, the name of a program that is called, a coordinate value at the time of the call, modal information at the time of the call, a macro variable value, and the like and further enable a check of an argument in the case of a macro call, and a numerical control method thereof.

BRIEF DESCRIPTION OF THE DRAWINGS

These and other objects and features of the present invention will become apparent from the following description of exemplary embodiments with reference to the accompanying drawings in which:

FIG. 5 is a diagram illustrating a stop specified by the type of a program call.

FIG. 6 is a diagram illustrating display of information of a program calling side.

FIG. 7 is an example of a screen when a program is stopped.

DETAILED DESCRIPTION OF THE PREFERRED EMBODIMENTS

Some embodiments according to the present invention relate to a numerical controller enabling a sub program call that can smoothly perform an operation check by stopping execution of a program immediately after a call by a macro call or a sub program call. Some units for stopping execution of a program immediately after a call by a macro call or a sub program call in some embodiments will be described below.

<First Embodiment> Specified to Stop in Accordance with the Type of a Program Call Each of a macro call and a sub program call has a plurality of calling methods. In a first embodiment, whether to stop execution of a program can be specified for each type of the calling methods. An operation check of a program can be smoothly performed in accordance with the type of the calling method.

FIG. 5 is an example of combined use of a macro call (a) and a simple call (b) using a G code. A program "O9010" is called using a G code "G81". In this case, the stop condition of the program is a macro call using a G code. A stop can be made at the head of the program "O9010" in accordance with a specification that a stop is made by a macro call using a G code. In the program O9010, a G code "G65" is in a block of a simple call, and a stop is thus not made at the head of a program O0100. Because the calling method of the program "O9010" (macro call using a G code) and that of the program O0100 (simple call) are different, a program stop determination unit 17 (see FIG. 8) distinguishes the two programs and causes a program stop request to be issued to a command program analysis unit 12 and an interpolation processing unit 13 only for the program O9010 to stop the program.

This specification method can specify the type of a call such as a macro call using a G code and a simple call, and thus a program other than O09010 also can be stopped when a macro call using a G code is commanded. Furthermore, when O9010 is called by a simple call, O9010 is not to be stopped. With this configuration, a check at the time of a program stop can be prevented from becoming troublesome. More specifically, it is possible to perform a check at the time of a program stop only in the case of a macro call using a G code, whereby there is an advantage that an operation check of a program can be performed smoothly.

<Second Embodiment> Specified to Stop by a First Call and not to Stop by a Second Call or a Call Thereafter In FIG. 5, specification is enabled that a stop is made by a first call and not made by a second call or a call thereafter. In this case, the stop condition of a program is a macro call using a G code which is a first call.

Figure 1:
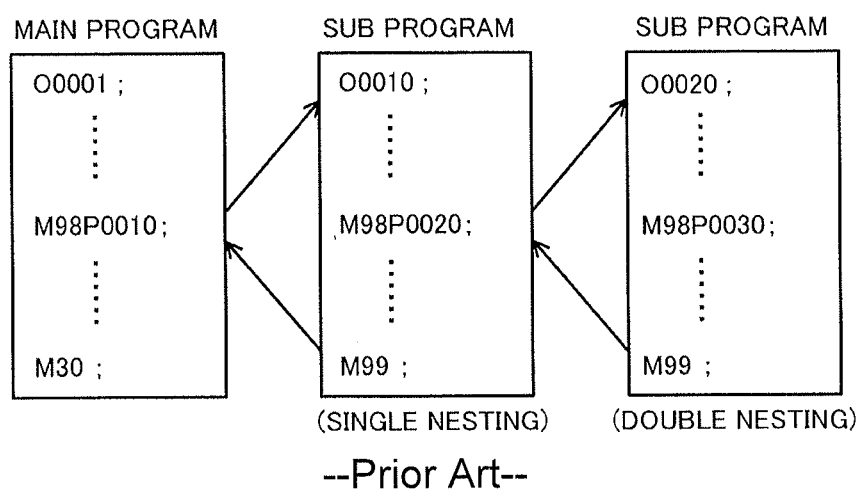
FIG. 1 is a diagram illustrating a sub program call.
Figure 2:
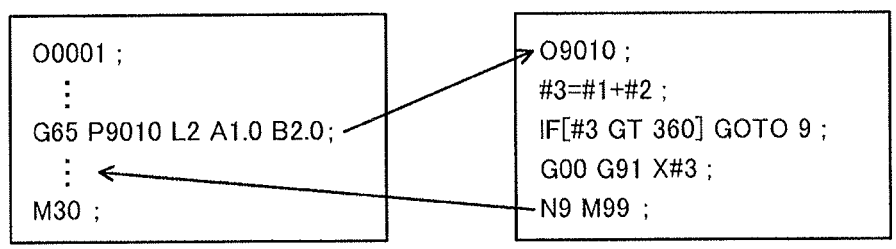
FIG. 2 is a diagram illustrating a macro call.
Figure 3:
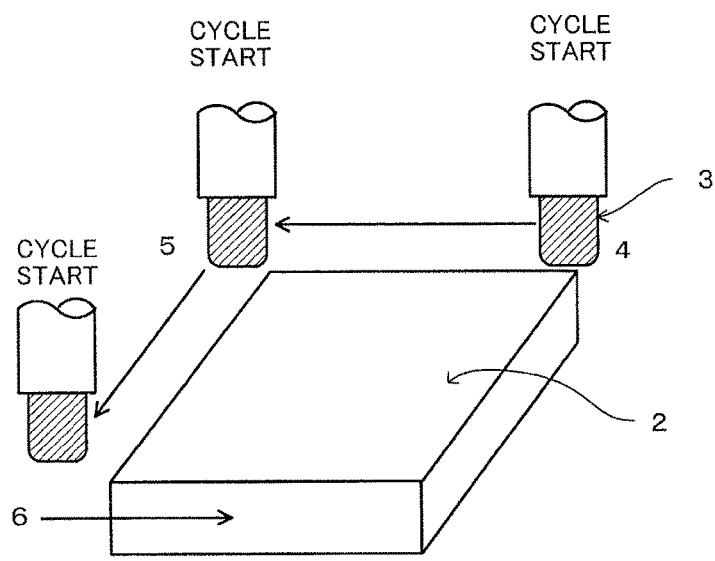
FIG. 3 is a diagram illustrating a single block operation.
Figure 4:
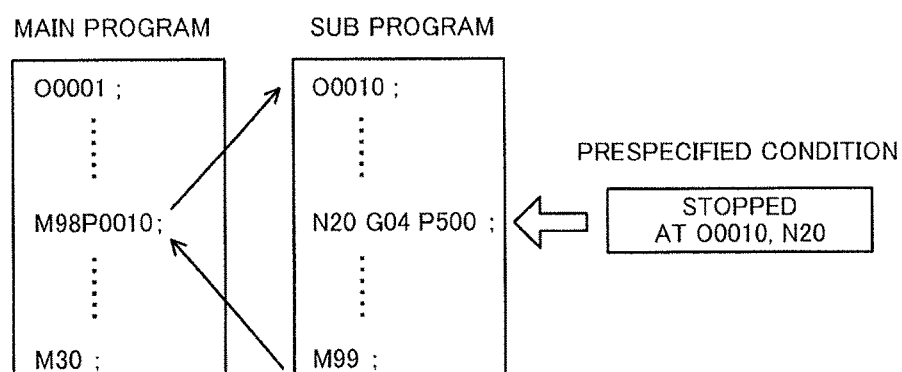
FIG. 4 is a diagram illustrating a stop in accordance with sequence number specification.
Figure 8:
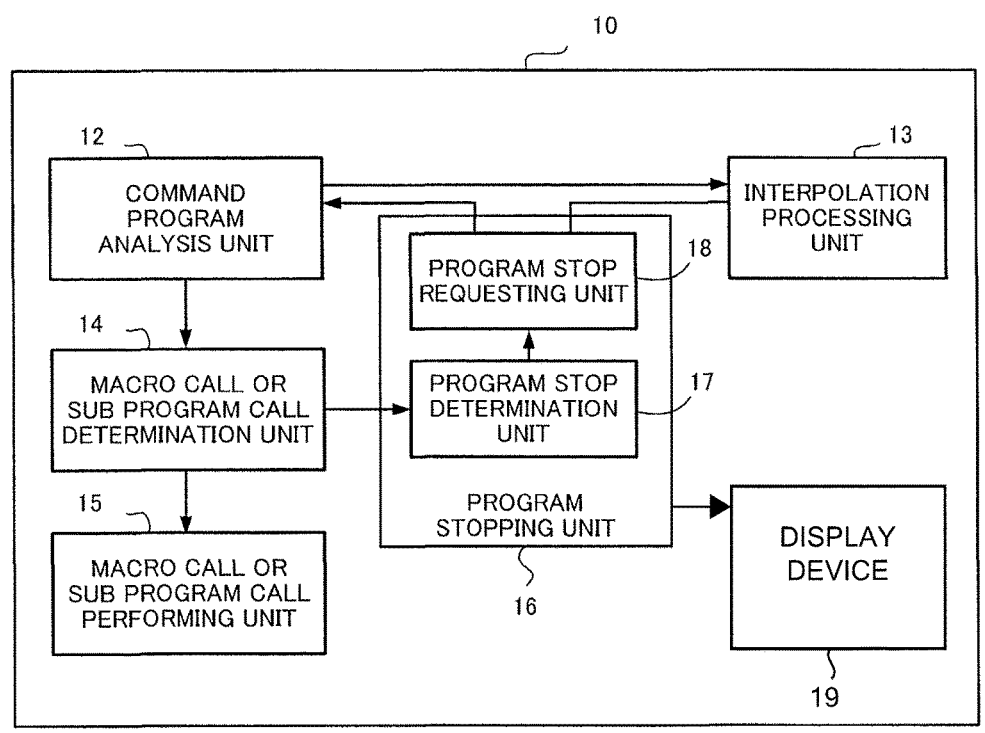
FIG. 8 is a block diagram illustrating a numerical controller.

The program stop determination unit 17 distinguishes a first call and a second call or a call thereafter, and causes a program stop requesting unit 18 to issue a program stop request to the command program analysis unit 12 and the interpolation processing unit 13 only for the first call to stop the program (see FIG. 8). In general, if an operation check has been performed at a first call, the operation of the program does not have to be stopped by a second call. Thus, a check at the time of a program stop can be prevented from becoming troublesome, whereby an operation check of a program can be performed smoothly.

<Third Embodiment> Information of a Program Calling Side is Displayed when the Program is Stopped FIG. 6 is a diagram illustrating display of information of a program calling side. At the stop immediately after a macro call or a sub program call, information of a calling side is displayed as illustrated in FIG. 6. In this case, the stop condition of the program is a simple call. The command program analysis unit 12 having received a program stop request, sends information that is currently analyzed to a display processing unit. As illustrated in FIG. 7, in a display unit (display device 19) included in the numerical controller 10, the information of a calling side is displayed along with the type of the specified program call, whereby an operation check can be performed smoothly.

FIG. 8 is a block diagram illustrating a numerical controller. In general, the numerical controller 10 analyzes a program with the command program analysis unit 12, determines a macro call or a sub program call with a macro call or sub program call determination unit 14, and performs a macro call or a sub program call with a macro call or sub program call performing unit 15.

The program stop determination unit 17 of a program stopping unit 16 determines information of a macro call or a sub program call received from the macro call or sub program call determination unit 14 to determine whether to stop the program. When the program stop determination unit 17 determines that the program is to be stopped, the program stop determination unit 17 commands the program stop requesting unit 18 to output a program stop request to the command program analysis unit 12 and the interpolation processing unit 13, thereby stopping the program.

Figure 9:
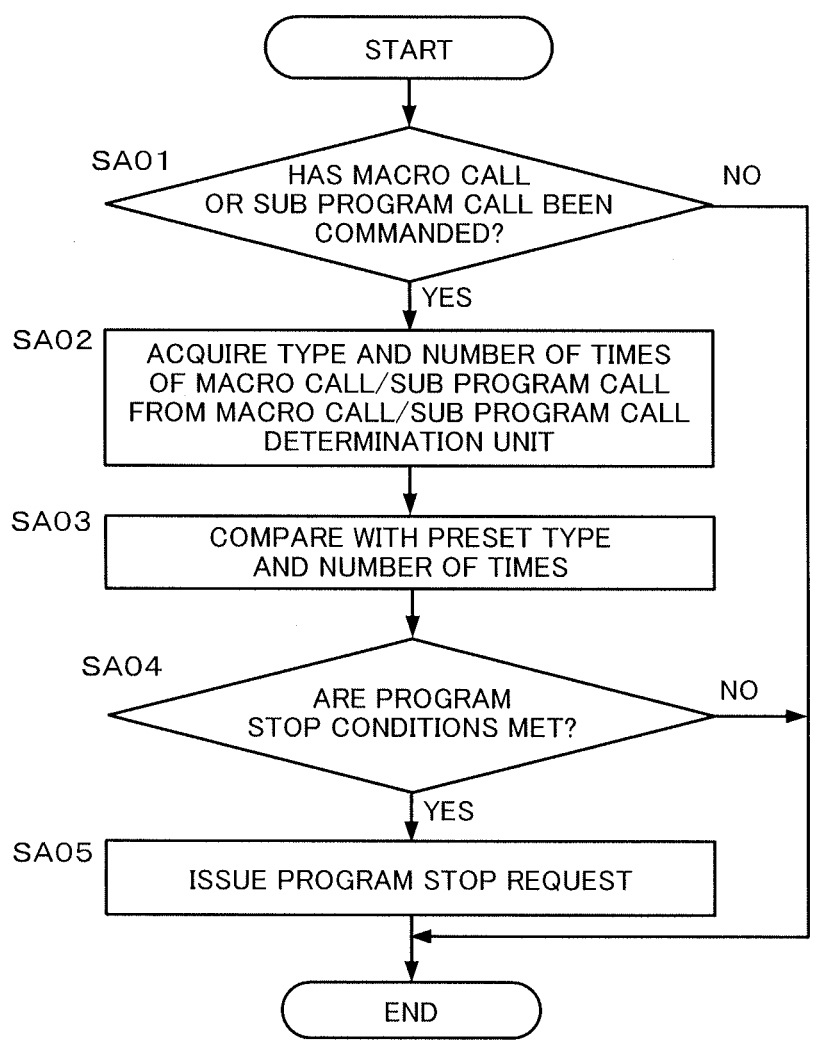
FIG. 9 is a flowchart illustrating processing.

Next, a flowchart of a determination of a program stop in the second embodiment will be described below. FIG. 9 is a flowchart illustrating processing in the present embodiment. This processing is called from the macro call or sub program call determination unit. The conditions under which this processing is performed are described below.

(Conditions)

A macro call or a sub program call is commanded.

A macro call or a sub program call can be performed. For example, a program specified for the call is present.

[Step SA01] A determination is made whether a macro call or a sub program call has been commanded. If a macro call or a sub program call has been commanded (YES), the processing moves to step SA02. If a macro call or a sub program call has not been commanded (NO), the processing is completed.

[Step SA02] The type and the number of times of a macro call or a sub program call are acquired from the macro call or sub program call determination unit.

[Step SA03] The acquired type and number of times are compared with the preset type and number of times.

[Step SA04] A determination is made whether the acquired type and number of times meet the stop conditions of the program. If the acquired type and number of times meet the stop conditions of the program (YES), the processing moves to step SA05. If the acquired type and number of times do not meet the stop conditions of the program (NO), the processing is completed.

[Step SA05] A program stop request is issued and the processing is completed.

"HAS MACRO CALL OR SUB PROGRAM CALL BEEN COMMANDED?" in the flowchart is processing performed by a macro call or sub program call determination unit in a general numerical controller. "TYPE AND NUMBER OF TIMES OF MACRO CALL OR SUB PROGRAM CALL" represents the type of a call such as a macro call using a G code, a simple call, or a sub program call and the number of times of the call. With respect to "PRESET TYPE AND NUMBER OF TIMES", stop conditions are preset such as what type of the call stops the program among the types described above and a stop is made by a first call but not by a second call or a call thereafter. "PRESET TYPE AND NUMBER OF TIMES" represents the preset type and number of times.

In the second embodiment, a stop is made by a macro call using a G code, and a stop is made by a first call but not by a second call or a call thereafter. "COMPARE WITH PRESET TYPE AND NUMBER OF TIMES" and "ARE PROGRAM STOP CONDITIONS MET?" represent that the type and the number of times acquired from the macro call or sub program call determination unit are compared with the preset type and number of times, and a determination is made whether the acquired type and number of times meet the stop conditions.

The invention claimed is:

1. A numerical controller comprising:
   a controller configured to control a machine tool by analyzing and executing blocks of a machining program to machine a workpiece, wherein the controller has at least one of a macro call function and a sub program call function that enables an operation check to be performed on the machining program by temporarily stopping the machining program from machining the workpiece by the machine tool, and wherein the controller is configured to perform the method including:
   analyzing the machining program;
   determining whether a command of the analyzed machining program is at least one of a macro call and a sub program call;
   determining a type of call and a number of times of the call, wherein the type of call includes a macro call or a sub program call;
   determining whether the command of the analyzed program is one of a first call, a second call, or a call thereafter;
   stopping execution of the machining program immediately after the at least one of the macro call and the sub program call when the determined command is the first call and when the determined command includes the at least one of the macro call and the sub program call; and
   continuing execution of the machining program to machine the workpiece when the determined command includes the second call and the call thereafter and when the determined command includes the at least one of the macro call and the sub program call.

2. The numerical controller according to claim 1, further comprising:
   displaying information of a calling side when the machining program is stopped at the time of the stop immediately after the at least one of the macro call and the sub program call.

3. The numerical controller according to claim 2, wherein display information includes one or more of a name of a program that is calling, a name of a program that is called, a coordinate value at a time of the call, modal information at a time of the call, and a macro variable value.

4. The numerical controller according to claim 1, further comprising:
   displaying information of a calling side when the machining program is stopped at the time of the stop immediately after the at least one of the macro call and sub program call.

5. The numerical controller according to claim 4, wherein display information includes one or more of a name of a program that is calling, a name of a program that is called, a coordinate value at a time of the call, modal information at a time of the call, and a macro variable value.

6. A numerical control method comprising:
   controlling, by a numerical controller, a machine tool by analyzing and executing blocks of a machining program to machine a workpiece, wherein the numerical controller has at least one of a macro call function and a sub program call function that enables an operation check to be performed on the machining program by temporarily stopping the machining program from machining the workpiece by the machine tool;
   analyzing the machining program;
   determining whether a command of the analyzed program is at least one of a macro call and a sub program call;
   determining a type of call and a number of times of the call, wherein the type of call includes a macro call or a sub program call;
   determining whether a command of the analyzed program is one of a first call, a second call, or a call thereafter;
   stopping execution of the machining program immediately after the at least one of the macro call and the sub program call when the determined command is the first call and when the determined command includes the at least one of the macro call and the sub program call; and
   continuing execution of the machining program after the at least one of the macro call and the sub program call when the determined command includes the second call and the call thereafter and when the determined command includes the at least one of the macro call and the sub program call.

7. The numerical control method of a numerical controller according to claim 6, wherein at the stopping immediately after the at least one of the macro call and the sub program call, display information of a calling side is displayed by display-unit the numerical controller when the machining program is stopped.

8. The numerical control method of a numerical controller according to claim 7, wherein display information includes one or more of a name of a program that is calling, a name of a program that is called, a coordinate value at a time of the call, modal information at a time of the call, and a macro variable value.

9. The numerical control method of a numerical controller according to claim 6,
 wherein at the stopping immediately after the at least one of the macro call and the sub program call, display information of a calling side is displayed by the numerical controller when the machining program is stopped.

10. The numerical control method of a numerical controller according to claim 9, wherein display information includes one or more of a name of a program that is calling, a name of a program that is called, a coordinate value at a time of the call, modal information at a time of the call, and a macro variable value.

* * * * *